(12) United States Patent
Huang et al.

(10) Patent No.: US 6,443,378 B1
(45) Date of Patent: Sep. 3, 2002

(54) PEPPER MILL

(76) Inventors: James Huang, 7F-4, No. 9, Lane 416, Sec. 2, Chung-Hwa Rd., Taipei City (TW); John Wu, 3F, No. 183, Sec. 4, Nan-King E. Rd., Taipei City (TW)

( * ) Notice: Subject to any disclaimer, the term of this patent is extended or adjusted under 35 U.S.C. 154(b) by 0 days.

(21) Appl. No.: 09/811,515

(22) Filed: Mar. 20, 2001

(51) Int. Cl.[7] ................................................. A47J 42/06
(52) U.S. Cl. .................................................. 241/169.1
(58) Field of Search ............................ 241/168, 169.1, 241/169

(56) References Cited

U.S. PATENT DOCUMENTS 5,022,591 A * 6/1991 Sanders ................... 241/169.1
5,082,190 A * 1/1992 Chen ....................... 241/169.1

* cited by examiner

Primary Examiner—Mark Rosenbaum
(74) Attorney, Agent, or Firm—Rosenberg, Klein & Lee

(57) ABSTRACT

A pepper mill includes a housing holding a driving mechanism and an output shaft, a top cover shell covered on the housing and defining with the housing a peppercorn chamber, the top cover shell having a peppercorn inlet through which peppercorns are inserted into the peppercorn chamber for further grinding, a threaded top neck, and a transparent swivel frame adapted to close/open the peppercorn inlet, a grinding mechanism provided in the top cover shell and driven by the output shaft to grind peppercorns into powder, a screw cap threaded onto the threaded top neck of the housing for output of ground pepper powder, and a protective cap adapted to close the screw cap.

6 Claims, 5 Drawing Sheets

PEPPER MILL

BACKGROUND OF THE INVENTION

1. Field of the Invention

The present invention relates to a pepper mill and, more particularly, to an improved structure of pepper mill, which comprises a housing holding a driving mechanism, a top cover shell covered on the housing and defining with the housing a peppercorn chamber for receiving peppercorns inserted through an inlet in the peripheral wall of the top cover shell, and a grinding mechanism provided in the top cover shell and driven by the driving mechanism to grind inserted peppercorns into powder.

2. Brief Description of the Prior Art

Various handy pepper mills have been disclosed for grinding peppercorns into powder, and are commercially available. FIG. 1 shows a pepper mill according to the prior art. This structure of pepper mill comprises a top housing 12, a bottom housing 16, a transparent intermediate shell 14 connected between the upper housing 12 and the bottom housing 16, a driving mechanism (not shown) mounted in the upper housing 12, an on/off switch 122 adapted to control the operation of the driving mechanism, an output shaft 124 downwardly extended from the driving mechanism and suspended in the transparent intermediate shell 4, and a grinding mechanism (not shown) provided in the bottom housing 16 and driven by the output shaft 124 to grind peppercorns into powder. When switching on the on/off switch 122 with the hand H, peppercorns are ground by the grinding mechanism into pepper powder 70 for application. This structure of pepper mill is still not satisfactory in function. One drawback of this structure of pepper mill is that residual pepper powder tends to fall out of the bottom dispensing port of the bottom housing when putting the pepper mill on a flat surface. Another drawback of this structure of pepper mill is that the top housing must be opened from the intermediate shell so that peppercorns can be put in the bottom housing for grinding. Further, when cleaning the pepper mill, the parts must be detached from one another.

SUMMARY OF THE INVENTION

The present invention has been accomplished to provide a pepper mill, which eliminates the aforesaid drawbacks. It is one object of the present invention to provide a pepper mill, which has its pepper powder dispensing port disposed at the top side. It is another object of the present invention to provide a pepper mill, which enables the user to feed peppercorns for grinding conveniently. It is still another object of the present invention to provide a pepper mill, which enables the user to clean the grinding mechanism conveniently. It is still another object of the present invention to provide a pepper mill, which well protects the internal grinding mechanism against outside dust. According to one aspect of the present invention, the pepper mill includes a housing holding a driving mechanism and an output shaft, a top cover shell covered on the housing and defining with the housing a peppercorn chamber, the top cover shell having a threaded top neck, a grinding mechanism provided in the top cover shell and driven by the output shaft to grind peppercorns into powder, and a screw cap threaded onto the threaded top neck of the housing for output of ground pepper powder. According to another aspect of the present invention, the top cover shell has a peppercorn inlet through which peppercorns are inserted into the peppercorn chamber for further grinding. According to still another aspect of the present invention, a bracket is provided inside the top cover shell and defining with the threaded top neck of the top cover shell a grinding chamber within which the grinding mechanism is driven to grind peppercorns into powder. According to still another aspect of the present invention, a transparent swivel frame is pivoted to the top cover shell and adapted to close/open the peppercorn inlet. According to still another aspect of the present invention, a protective cap is adapted to close the screw cap.

DETAILED DESCRIPTION OF THE PREFERRED EMBODIMENT

Figure 1:
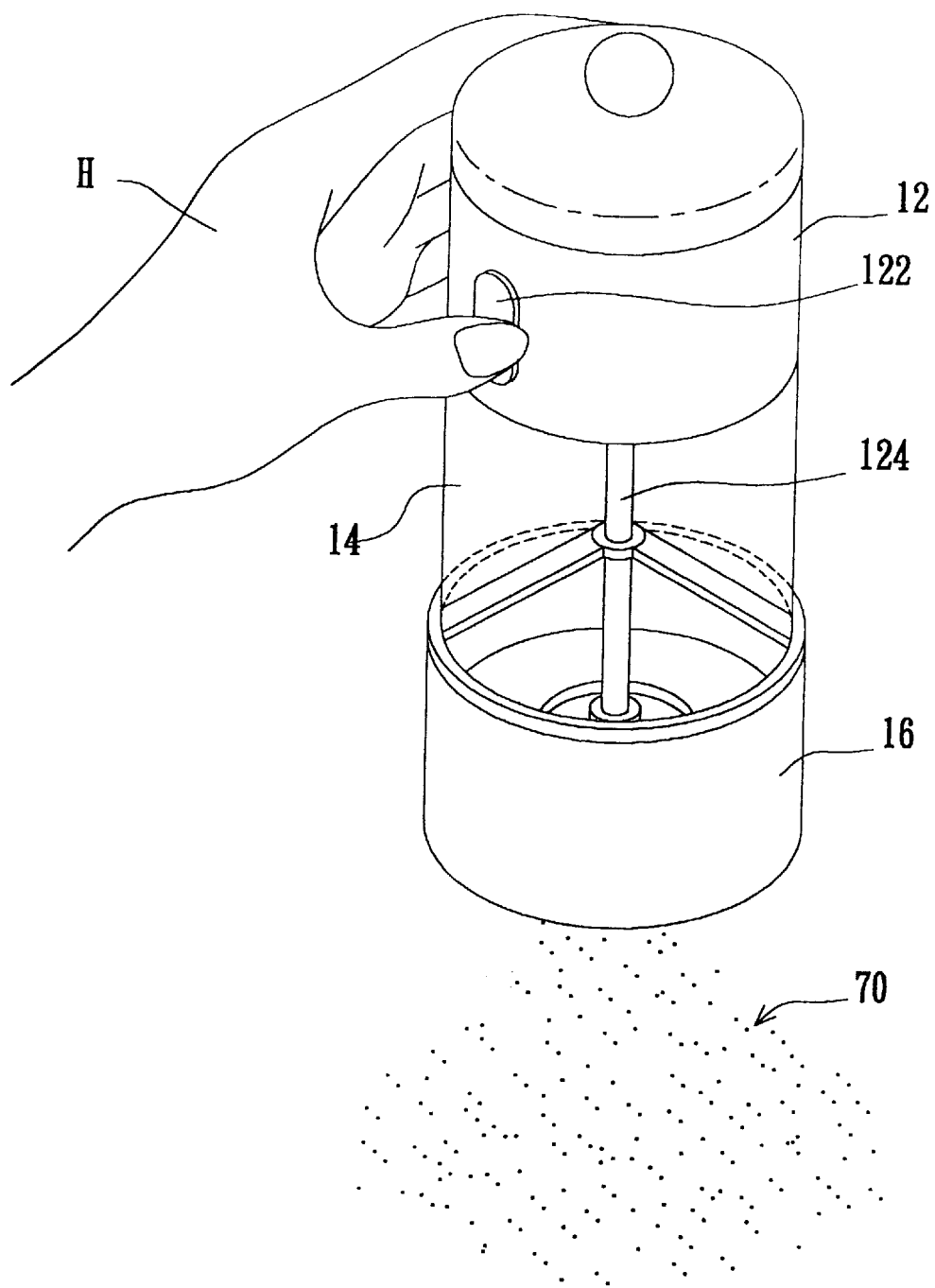
FIG. 1 is an elevational view of a pepper mill according to the prior art.

Referring to FIGS. from 2 through 4, a pepper mill is shown comprising a housing 50, a top cover shell 30, an outer grinding member 64, an inner grinding member 62, a swivel frame 40, a screw cap 32, and a protective cap 20. The housing 50 is a cylindrical structure convenient for holding by hand, comprising a driving mechanism (not shown) mounted on the inside, an output shaft 54 coupled to the driving mechanism and extended out of a top center through hole (not shown), and an on/off switch 52 provided at the periphery at a suitable location. The driving mechanism can be a manual driving mechanism operated by hand to rotate the output shaft 54. Alternatively, the driving mechanism can be an electricity-driven driving mechanism. According to the present preferred embodiment of the present invention, the driving mechanism is an electricity-driven driving mechanism controlled by the on/off switch 52. The bottom side of the housing 50 is a flat base adapted to support the pepper mill on a flat surface. The top cover shell 30 is shaped like a conical tube covered on the housing 50 over the output shaft 54 and defining with the housing 50 a peppercorn chamber 38, having an inlet 385 for input of peppercorns into the peppercorn chamber 38, two eye lugs 33 disposed at two sides in the inlet 385, and a threaded top neck 34. The outer grinding member 64 is an annular grinding member formed integral with the inside wall of the threaded top neck 34 of the top cover shell 30. The inner grinding member 62 is fixedly mounted on the top end of the output shaft 54, and suspended within the outer grinding member 64. The inner grinding member 62 and the outer grinding member 64 form a grinding mechanism adapted to grind peppercorns into powder. The swivel frame 40 is connected to the top cover shell 30 and turned to close/open the inlet 385, having two pivot rods 43 disposed at two sides and respectively pivoted to the eye lugs 33 of the top cover shell 30.

Referring to FIGS. from 2 through 4 again, a bracket 36 is disposed in the top cover shell 30 at the bottom side of the outer grinding member 64. The bracket 36 comprises a center ring 364, and a plurality of radial ribs 366 respectively radially connected between the periphery of the center ring 364 and the inside wall of the top cover shell 30. The radial ribs 366 define with the periphery of the center ring 364 and the inside wall of the top cover shell 30 a plurality of openings 362 around the center ring 364 for the passing of peppercorns. The output shaft 54 is inserted through the center ring 364 and connected to the inner grinding member 62. The screw cap 32 is threaded onto the threaded top neck 34 of the top cover shell 30, forming with the threaded top neck 34 of the top cover shell 30 a grinding chamber in which the inner grinding member 62 works with the outer grinding member 64 to grind peppercorns into powder. The protective cap 20 is detachably closed on the screw cap 32 to protect the grinding chamber and the peppercorn chamber 38 against outside dust. The protective cap 20 has a bottom chamber 22 adapted to hold pepper powder for application. When cleaning the grinding mechanism of the pepper mill, the protective cap 20 is removed from the screw cap 32, and then the screw cap 32 is unfastened from the threaded top neck 34 of the top cover shell. After cleaning, the screw cap 32 and the protective cap 20 are fastened to the top cover shell 30 again.

Figure 2:
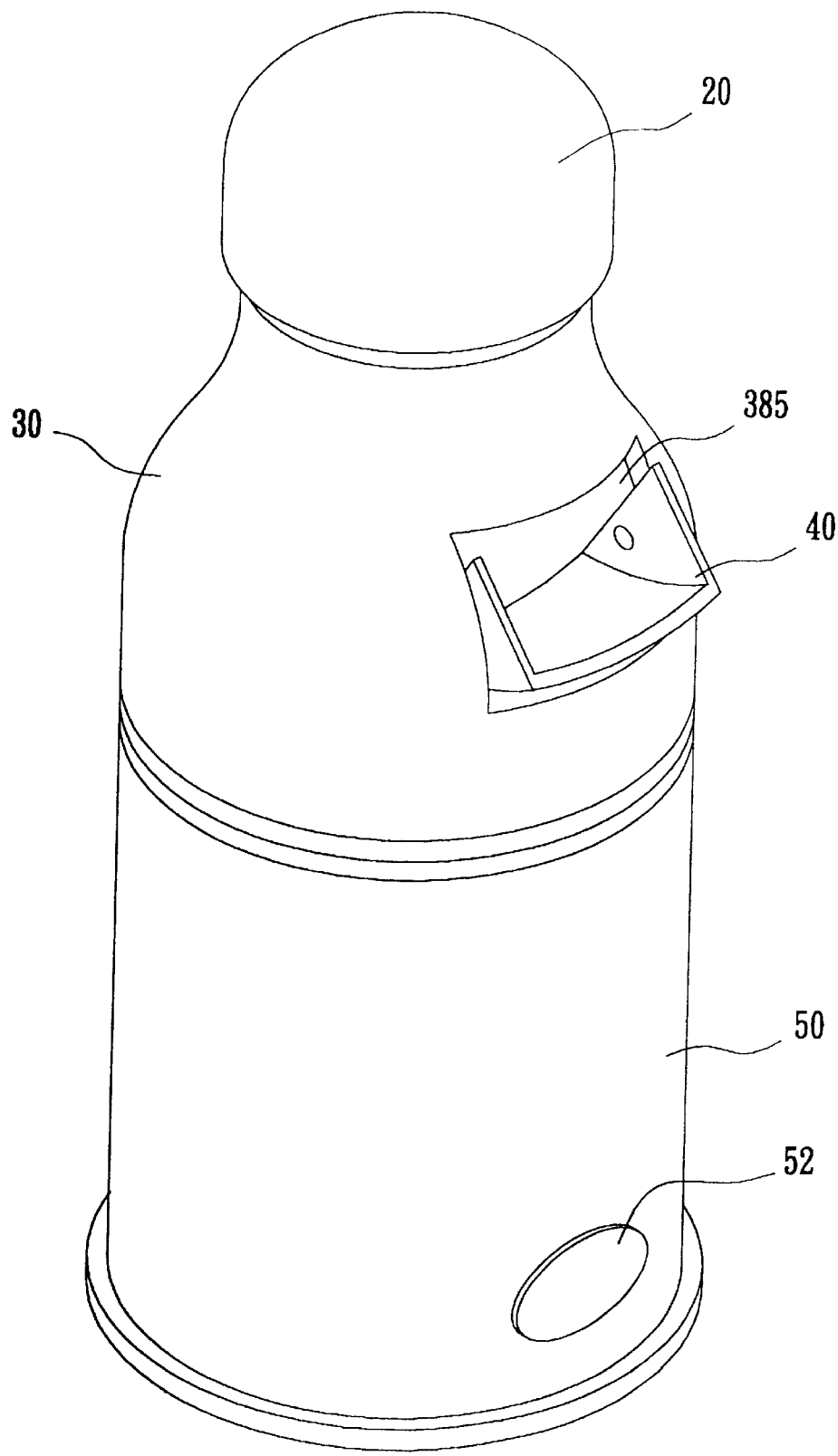
FIG. 2 is an elevational of a pepper mill according to the preferred embodiment of the present invention.
Figure 3:
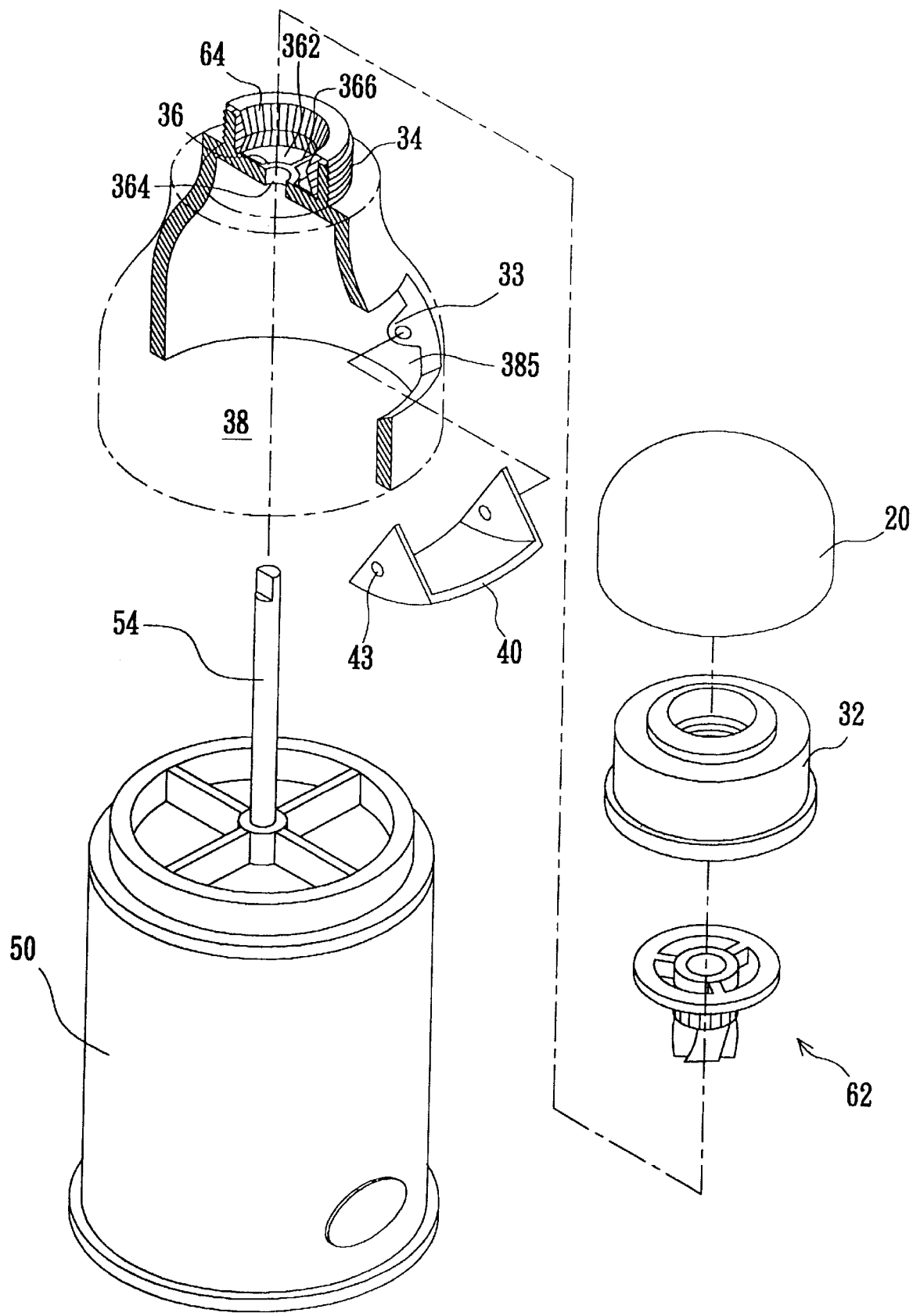
FIG. 3 is an exploded view, partially cutaway, of the pepper mill according to the preferred embodiment of the present invention.
Figure 4:
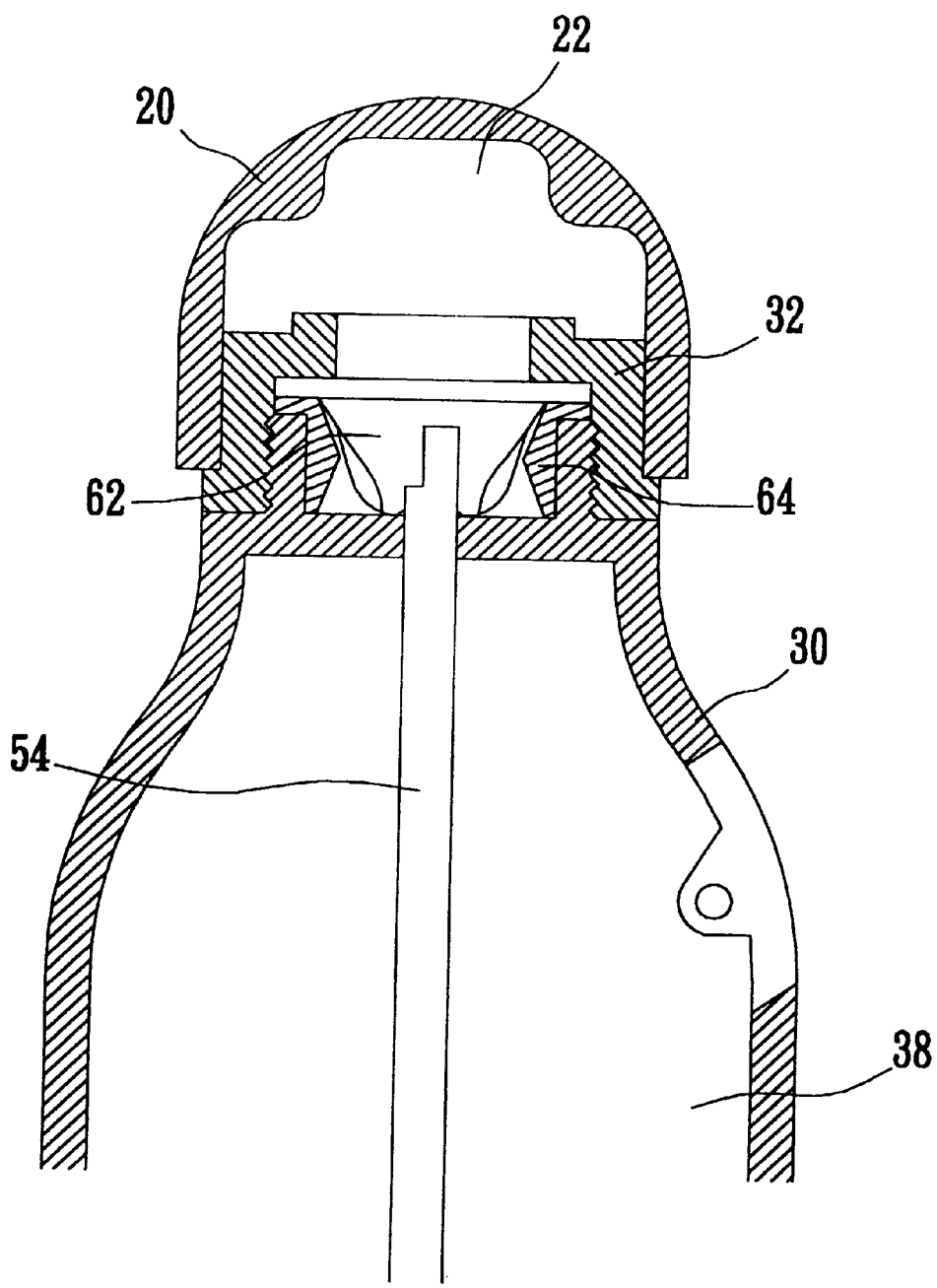
FIG. 4 is a sectional view of the pepper mill according to the preferred embodiment of the present invention.
Figure 5:
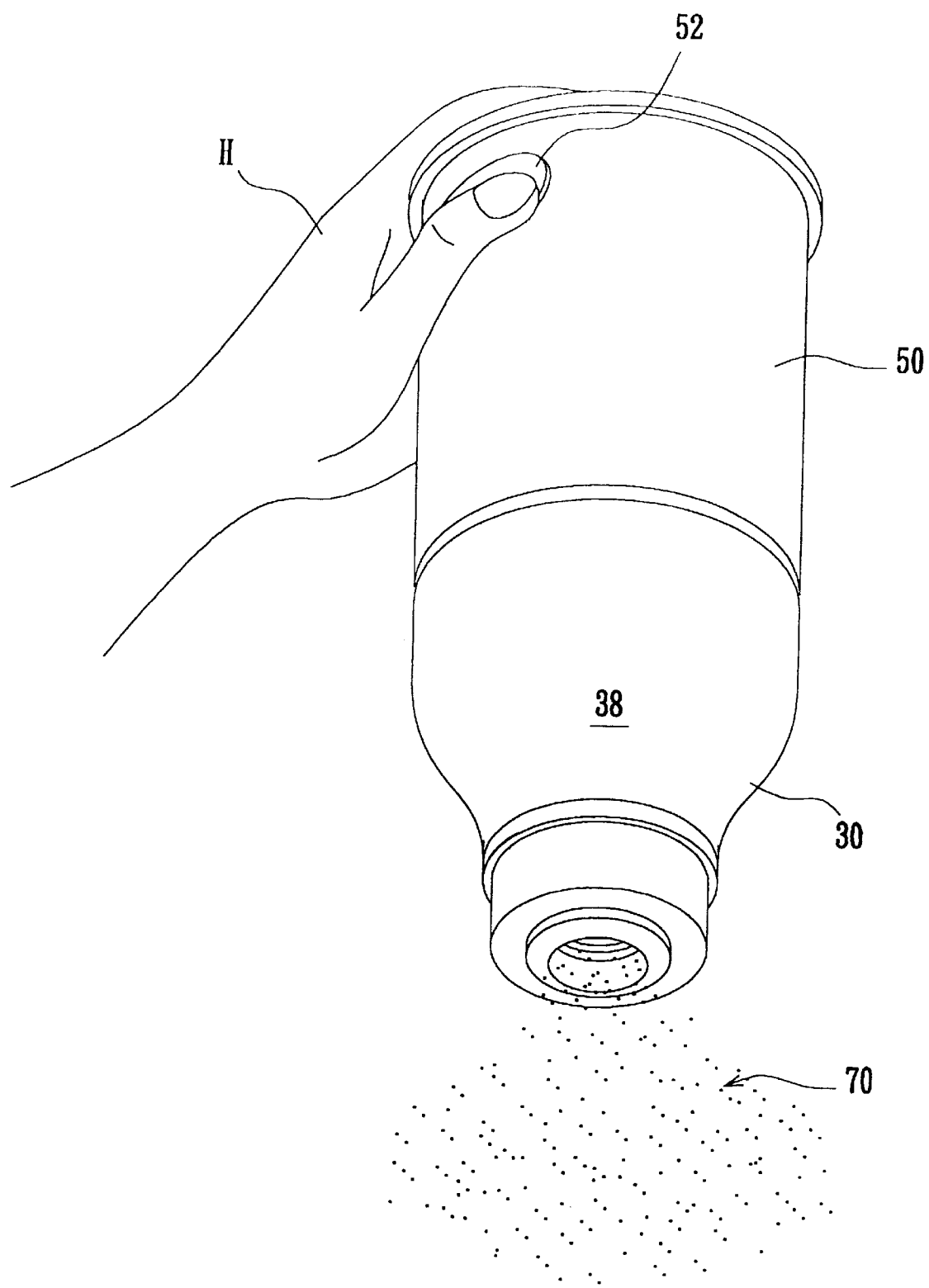
FIG. 5 is an applied view of the present invention, showing pepper powder shaken out of the pepper mill.

Referring to FIG. 5 and FIG. 2 again, after insertion of peppercorns through the inlet 385 into the peppercorn chamber 38 and removal of the protective cap 20 from the screw cap 32, the pepper mill is turned upside down with the hand H, and the on/off switch 52 is switched on to rotate the output shaft 54, causing the inner grinding member 62 to grind with the outer grinding member 64 inserted peppercorns into powder, enabling ground pepper powder 70 to be shaken out of the screw cap 32 and applied to the food. When turning the pepper mill upside down, the swivel frame 40 is turned from the open position to the close position to close the inlet 385. Preferably, the swivel frame 40 is made of transparent material, so that the user can visually check the amount of peppercorns put in the peppercorn chamber 38 and the running of the internal grinding mechanism.

A prototype of pepper mill has been constructed with the features of FIGS. 1-5. The pepper mill functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A pepper mill comprising:

a cylindrical housing fitting the hand, said housing comprising a driving mechanism, an output shaft extended out of a top side thereof and coupled to said driving mechanism and driven to rotate by said driving mechanism, and a flat bottom base for positioning on a flat surface;

a top cover shell covered on said housing over said output shaft and defining with said housing a peppercorn chamber, said top cover shell comprising a threaded top neck, and an inlet in the periphery thereof through which peppercorns are inserted into said peppercorn chamber;

a grinding mechanism installed in said top cover shell and driven by said output shaft to grind peppercorns into powder, said grinding mechanism comprising an outer grinding member fixedly provided in said threaded top neck of said top cover shell, and an inner grinding member fixedly mounted on said output shaft within said outer grinding member and rotated with said output shaft relative to said outer grinding member to grind peppercorns into powder; and a swivel frame pivoted to the inlet of said top cover shell and adapted to close the inlet of said top cover shell when said top cover shell is turned upside down with said housing.

2. The pepper mill of claim 1 further comprising a screw cap threaded onto the threaded top neck of said top cover shell for output of ground pepper powder, and a bracket disposed in the threaded top neck of said top cover shell below said outer grinding member, said bracket comprising a center ring through which said output shaft passes, and a plurality of radial ribs respectively radially extended from the periphery of said center ring to an inside wall of the threaded top neck of said top cover shell.

3. The pepper mill of claim 1 wherein said swivel frame is made of transparent material.

4. The pepper mill of claim 2 further comprising a protective cap adapted to close said screw cap.

5. The pepper mill of claim 1 wherein said driving mechanism is driven by electricity and controlled by an on/off switch provided at said housing.

6. The pepper mill of claim 1 wherein said driving mechanism is a manual driving mechanism adapted to rotate said output shaft by hand.

\* \* \* \* \*